United States Patent
Nguyen et al.

(10) Patent No.: US 8,830,362 B2
(45) Date of Patent: Sep. 9, 2014

(54) IMAGE PROCESSING APPARATUS AND IMAGE PROCESSING METHOD FOR REDUCING IMAGE BLUR IN AN INPUT IMAGE WHILE REDUCING NOISE INCLUDED IN THE INPUT IMAGE AND RESTRAINING DEGRADATION OF THE INPUT IMAGE CAUSED BY THE NOISE REDUCTION

(75) Inventors: Khang Nguyen, Osaka (JP); Yusuke Monobe, Kyoto (JP); Masataka Ejima, Osaka (JP)

(73) Assignee: Panasonic Corporation, Osaka (JP)

( * ) Notice: Subject to any disclaimer, the term of this patent is extended or adjusted under 35 U.S.C. 154(b) by 208 days.

(21) Appl. No.: 13/503,400

(22) PCT Filed: Aug. 31, 2011

(86) PCT No.: PCT/JP2011/004854
§ 371 (c)(1),
(2), (4) Date: Apr. 23, 2012

(87) PCT Pub. No.: WO2012/029296
PCT Pub. Date: Mar. 8, 2012

(65) Prior Publication Data
US 2012/0206630 A1 Aug. 16, 2012

(30) Foreign Application Priority Data

Sep. 1, 2010 (JP) ................................. 2010-196231

(51) Int. Cl.
*H04N 5/217* (2011.01)
*G06T 5/10* (2006.01)
*G06T 5/00* (2006.01)
*H04N 1/409* (2006.01)
*H04N 5/21* (2006.01)

(52) U.S. Cl.
CPC *H04N 1/409* (2013.01); *G06T 5/10* (2013.01); *G06T 5/003* (2013.01); *G06T 2207/20056* (2013.01); *H04N 5/21* (2013.01); *G06T 5/002* (2013.01)
USPC .......................................... 348/241; 382/255

(58) Field of Classification Search
CPC ...... H04N 5/361; H04N 5/3575; H04N 5/378; G06T 5/001
USPC ............................................ 348/241; 382/255
See application file for complete search history.

(56) References Cited

U.S. PATENT DOCUMENTS 5,991,457 A * 11/1999 Ito et al. ......................... 382/254
7,702,173 B2 * 4/2010 Gao et al. ....................... 382/260

(Continued)

FOREIGN PATENT DOCUMENTS

JP       05-347773      12/1993
JP       08-172533      7/1996

(Continued)

OTHER PUBLICATIONS

International Search Report issued Nov. 8, 2011 in International (PCT) Application No. PCT/JP2011/004854.

*Primary Examiner* — Tuan Ho
*Assistant Examiner* — Fayez Bhuiyan
(74) *Attorney, Agent, or Firm* — Wenderoth, Lind & Ponack, L.L.P.

(57) ABSTRACT

The present invention has an object to provide an image processing apparatus and an image processing method capable of, when reducing a blur in an input image, (i) reducing noise included in the input image and (ii) restraining degradation of the image caused by noise processing from being emphasized by image restoration processing. An image processing apparatus (100) for reducing a blur in an input image includes: a noise processing unit (10) which performs noise processing that reduces noise to the input image, to generate a noise-processed image; and a restoration processing unit (20) which performs image restoration processing that reduces a blur to the noise-processed image, the noise processing unit (10) performing the noise processing based on a characteristic of the image restoration processing.

14 Claims, 10 Drawing Sheets

(56) References Cited

U.S. PATENT DOCUMENTS

| | | | |
|---|---|---|---|
| 7,944,490 B2 * | 5/2011 | Hayashi | 348/294 |
| 8,532,422 B2 * | 9/2013 | Tanabe et al. | 382/255 |
| 2007/0046786 A1 | 3/2007 | Tokuyama | |
| 2008/0218635 A1 | 9/2008 | Tsuruoka | |
| 2010/0066874 A1 * | 3/2010 | Ishiga | 348/252 |
| 2010/0214438 A1 | 8/2010 | Hayashi et al. | |

FOREIGN PATENT DOCUMENTS

| | | |
|---|---|---|
| JP | 2007-067625 | 3/2007 |
| JP | 2007-142670 | 6/2007 |
| JP | 2007-179211 | 7/2007 |
| JP | 2009-089228 | 4/2009 |
| WO | 2007/013621 | 2/2007 |

* cited by examiner (a)

(b)

IMAGE PROCESSING APPARATUS AND IMAGE PROCESSING METHOD FOR REDUCING IMAGE BLUR IN AN INPUT IMAGE WHILE REDUCING NOISE INCLUDED IN THE INPUT IMAGE AND RESTRAINING DEGRADATION OF THE INPUT IMAGE CAUSED BY THE NOISE REDUCTION

TECHNICAL FIELD

The present invention relates to an image processing apparatus and an image processing method for reducing a blur in an input image.

BACKGROUND ART

An out-of-focus state or a camera shake during capturing causes a blur in an input image. By performing image restoration processing to a blurred input image, a high-definition output image can be obtained. However, the image restoration processing emphasizes high-frequency component of the input image, which causes noise included in the input image to be also amplified. Therefore, it is difficult to obtain a good output image through the mage restoration processing when noise is included in the input image.

Conventionally, a method of designing a restoration function using noise information has been proposed in order to prevent noise from being emphasized by the image restoration processing. Generally, in the image restoration processing, an inverse function of a degradation function H (u, v) is used as a restoration function M (u, v), as shown in Equation 1 below

[Math. 1]

$$M(u, v) = \frac{1}{H(u, v)} \quad \text{Equation 1}$$

An image degraded due to a blur etc. includes less high-frequency component. That is, emphasizing the high-frequency component can reduce the blur. However, emphasizing the high-frequency component as described above causes the noise to be emphasized as well.

In a method disclosed in Patent Literature 1, a restoration function M (u, v) is designed as shown in Equation 2 below by using a spectral density of noise, Sn (u, v), and a spectral density of an approximately-ideal image, Sf (u, v).

[Math. 2]

$$M(u, v) = \frac{1}{H(u, v)} \times \frac{|H(u, v)|^2}{|H(u, v)|^2 + Sn(u, v)/Sf(u, v)} \quad \text{Equation 2}$$

In Equation 2, the restoration function is designed based on a fact that an approximate amount of the noise is estimated based on a ratio of the spectral density of noise, Sn (u, v), to the spectral density of an approximately-ideal image, Sf (u, v). That is, in the restoration function shown in Equation 2, a degree of restoration by the image restoration processing is adjusted based on the amount of noise estimated. Specifically, when less noise is included (when Sn (u, v)/Sf (u, v) is very small), the restoration function shown in Equation 2 is approximately the same as the general restoration function (the inverse function of the degradation function) shown in Equation 1, whereby the image can be sufficiently restored. In contrast, when much noise is included (when Sn (u, v)/Sf v) is great), the restoration function shown in Equation 2 shows a smaller degree of restoration than the general restoration function shown in Equation 1, whereby the noise is restrained from being emphasized by the image restoration processing.

Furthermore, a method of reducing noise prior to and after the image restoration processing has been proposed (for example, see Patent Literature 2). FIG. 10 shows the conventional image restoration processing disclosed in Patent Literature 2.

In the conventional image restoration processing shown in FIG. 10, firstly, a first noise reduction filter processing 30 that reduces noise in an input image is performed, based on exposure information detected in an exposure information detection 40. Next, restoration processing 50 is performed to the noise-reduced image. Performing the first noise reduction filter processing 30 that reduces noise prior to the restoration process 50 as described above restrains the noise from being emphasized by the restoration processing 50. The noise is further reduced by performing a second noise reduction filter processing 60 after the restoration processing 50.

CITATION LIST

Patent Literature

[PTL 1] Japanese Unexamined Patent Application Publication No. 8-172533
[PTL 2] WO 2007/013621

SUMMARY OF INVENTION

Technical Problem

However, with the method disclosed in Patent Literature 1, an image is not sufficiently restored when the image includes much noise, because the degree of restoration in the image restoration processing is lowered. That is, the method disclosed in Patent Literature 1 has a problem that, when much noise is included, an out-of-focus or a motion blur remains in the image resulting from the restoration.

Furthermore, with the method disclosed in Patent Literature 2, not only noise but also a true image signal may be processed by the first noise reduction filter processing. In this case, there is a problem that not only the image is degraded by the first noise reduction filter processing but also the degradation of the image is emphasized by the restoration processing.

The present invention is conceived in view of the above problems and has an object to provide an image processing apparatus and an image processing method capable of, when reducing a blur in an input image, (i) reducing noise included in the input image and (ii) restraining degradation of the image caused by noise processing from being emphasized by image restoration processing.

Solution to Problem

In order to solve the above conventional problems, an image processing apparatus according to an aspect of the present invention is for reducing a blur in an input image and includes: a noise processing unit which performs noise processing that reduces noise to the input image, to generate a noise-processed image; and a restoration processing unit which performs image restoration processing that reduces a blur to the noise-processed image, the noise processing unit performing the noise processing based on a characteristic of the image restoration processing.

With this structure, the image processing apparatus performs the noise processing prior to the image restoration processing, thereby reducing the noise included in the input image. Moreover, the image processing apparatus performs the noise processing based on the characteristic of the image restoration processing, thereby restraining degradation of the image caused by the noise processing from being emphasized by the image restoration processing.

Furthermore, it is preferable that the noise processing unit performs the noise processing such that a degree of variation of the noise-processed image from the input image in a frequency domain is restricted according to the characteristic of the image restoration processing.

With this structure, the image processing apparatus can restrict the degree of variation of the noise-processed image from the input image in the frequency domain according to the characteristic of the image restoration processing, thereby efficiently restraining the degradation of the image caused by the noise processing from being emphasized by the image restoration processing.

Furthermore, it is preferable that the restoration processing unit performs the image restoration processing using a restoration function indicating a degree of restoration at each frequency in the frequency domain, and the characteristic of the image restoration processing is the degree of restoration indicated by the restoration function.

With this structure, the image processing apparatus can restrict the degree of variation according to the degree of restoration indicated by the restoration function, thereby efficiently restraining the degradation of the image caused by the noise processing from being emphasized by the image restoration processing.

Furthermore, it is preferable that the noise processing unit performs the noise processing such that the degree of variation at the frequency becomes more restricted as the degree of restoration at the frequency increases.

With this structure, the image processing apparatus can restrict the degree of variation at the frequency as the degree of restoration at the frequency increases. Accordingly, the image processing apparatus can prevent the image at the frequency in which the degradation of the image is likely to be emphasized from being degraded, thereby efficiently restraining the degradation of the image caused by the noise processing from being emphasized by the image restoration processing.

Furthermore, it is preferable that the noise processing unit includes: a noise reduction unit which performs noise reduction processing to the input image in a spatial domain, to generate a noise-reduced image; a first fluctuation range setting unit which sets a first fluctuation range for each frequency such that the first fluctuation range for restricting the degree of variation at the frequency decreases as the degree of restoration at the frequency increases, and a frequency restriction unit which modifies the noise-reduced image to generate the noise-processed image such that a variation indicating a magnitude of the degree of variation does not exceed the first fluctuation range.

With this structure, the image processing apparatus modifies the noise-reduced image such that the variation does not exceed the first fluctuation range, whereby easily generating a noise-processed image in which the degree of variation at the frequency becomes more restricted as the degree of restoration at the frequency increases.

Furthermore, it is preferable that the frequency restriction unit includes: a domain transforming unit which transforms the input image and the noise-reduced image from the spatial domain into the frequency domain; a comparison unit which calculates, for each frequency, an absolute value of a difference value between (i) an amplitude of the input image transformed into the frequency domain and (ii) an amplitude of the noise-reduced image transformed into the frequency domain, as the variation; and a modification unit which (i) determines, for each frequency, whether or not the variation exceeds the first fluctuation range and (ii) modifies the amplitude of the noise-reduced image such that the variation at the frequency matches the first fluctuation range when it is determined that the variation exceeds the first fluctuation range.

With this structure, when the variation exceeds the first fluctuation range, the image processing apparatus can modify the noise-reduced image such that the variation and the first fluctuation range match. Accordingly, the image processing apparatus can not only reduce the noise as much as possible but also restrain the degradation of the image caused by the noise processing from being emphasized by the image restoration processing.

Furthermore, it is preferable that the image processing apparatus further includes a second fluctuation range setting unit which sets a second fluctuation range that is uniform regardless of the frequency, based on noise information of the input image, and the frequency restriction unit modifies the noise-reduced image to generate the noise-processed image such that the variation does not exceed the first fluctuation range and the second fluctuation range.

With this structure, the image processing apparatus can also restrain the degradation of the image by the noise processing, by using the uniformity of the amplitude of the noise regardless of the frequency.

Furthermore, it is preferable that the noise information is calculated using a sensor characteristic of a camera, an ISO sensitivity obtained when the input image is captured, and luminance of the input image.

With this structure, it is possible to set the second fluctuation range to a high-definition based on the sensor characteristic of the camera, the ISO sensitivity obtained when the input image is captured, and the noise information calculated using the luminance of the input image.

Furthermore, it is preferable that the noise processing unit performs the noise processing based on the characteristic of the image restoration processing and noise information of the input image.

With this structure, the image processing apparatus can also restrain the degradation of the image by the noise processing, because the noise processing can be performed based on the noise information.

Furthermore, it is preferable that the noise information is calculated using a sensor characteristic of a camera, an ISO sensitivity obtained when the input image is captured, and luminance of the input image.

With this structure, the image processing apparatus can further restrain the degradation of the image by the noise processing, by performing the noise processing based on the sensor characteristic of the camera, the ISO sensitivity obtained when the input image is captured, and the noise information calculated using the luminance of the input image.

Furthermore, it is preferable that the characteristic of the image restoration processing is derived using an image degradation function of the input image.

With this structure, the image processing apparatus can perform the noise processing based on the characteristic of the image restoration processing derived using the image degradation function of the input image.

Furthermore, the image processing apparatus may be structured as an integrated circuit.

Furthermore, the present invention can be achieved not only as the image processing apparatus described above but also as an image processing method including characteristic components of the image processing apparatus described above. Furthermore, the present invention can be achieved as a program which causes a computer to execute the steps included in the image processing apparatus. In addition, it goes without saying that such program may be distributed via a non-transitory computer-readable recording medium such as Compact Disc Read Only Memory (CD-ROM) or a transmission medium such as the Internet.

Advantageous Effects of Invention

According to the present invention, the noise processing is performed prior to the image restoration processing, whereby the noise included in the input image is reduced. Moreover, the noise processing is performed based on the characteristic of the image restoration processing, whereby the degradation of the image caused by the noise processing is restrained from being emphasized by the image restoration processing.

DESCRIPTION OF EMBODIMENTS

Embodiments according to the present invention are described below with reference to the drawings. It is to be noted that each of the embodiments described below shows a preferable specific example of the present invention. That is, numeric values, shapes, materials, constituents, positions and topologies of the constituents, steps, an order of the steps, and the like in the following embodiments are an example of the present invention, and it should therefore not be construed that the present invention is determined by each of these embodiments. The present invention is determined by the statement in Claims. Accordingly, out of the constituents in the following embodiments, the constituents not stated in the independent claims describing the broadest concept of the present invention are not necessary for achieving the object of the present invention and are described as constituents in a more preferable embodiment.

[Embodiment 1]

Figure 1:
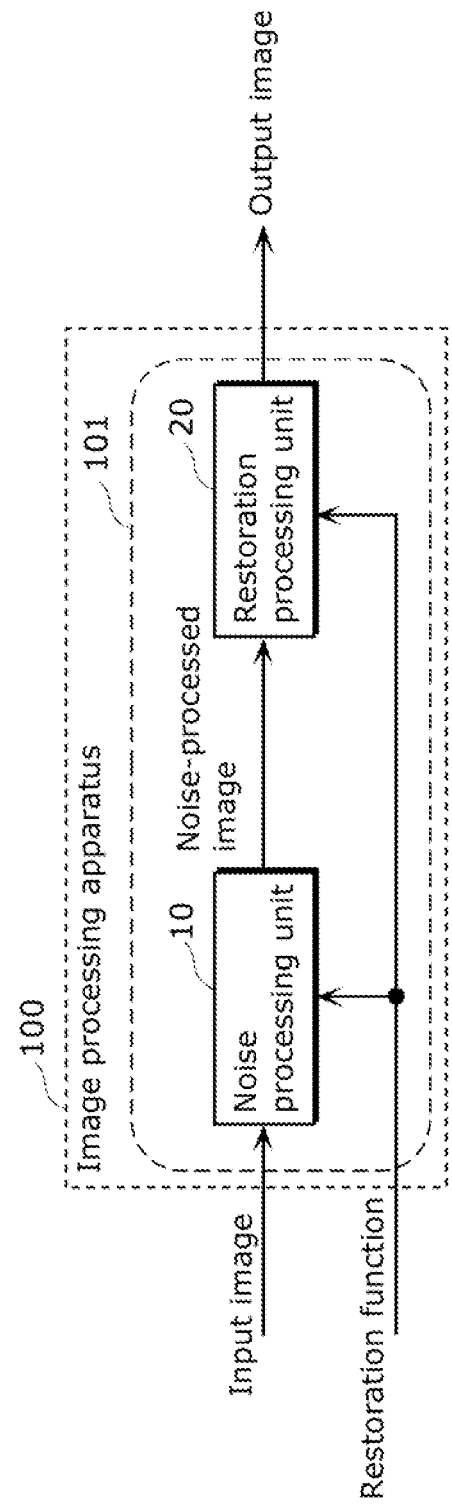
FIG. 1 shows a block diagram showing a function structure of an image processing apparatus according to Embodiment 1 of the present invention.

FIG. 1 is a block diagram showing a function structure of an image processing apparatus 100 according to Embodiment 1 of the present invention.

The image processing apparatus 100 reduces a blur in an input image. As shown in FIG. 1, the image processing apparatus 100 includes a noise processing unit 10 and a restoration processing unit 20.

The noise processing unit 10 reduces noise of an input image inputted. That is, the noise processing unit 10 performs noise processing that reduces noise to the input image, to generate a noise-processed image. At this time, the noise processing unit 10 performs the noise processing based on the characteristic of image restoration processing performed by the restoration processing unit 20. That is, the noise processing unit 10 performs the noise processing based on the characteristic of the image restoration processing and with adjusting a degree of reduction of the noise.

Specifically, the noise processing unit 10 performs the noise processing such that a degree of variation of the noise-processed image is restricted according to the characteristic of the image restoration processing. Here, the degree of variation of the noise-processed image indicates a degree of variation of the noise-processed image from the input image in the frequency domain.

More specifically, the noise processing unit 10 performs the noise processing such that the degree of variation is restricted according to the degree of restoration indicated by the restoration function. In the present embodiment, the noise processing unit 10 performs the noise processing such that the degree of variation at the frequency becomes more restricted as the degree of restoration at the frequency increases.

Here, the degree of restoration indicates a degree that frequency component of an object image to be processed is changed by the image restoration processing. That is, the frequency component is greatly changed by the image restoration processing as the degree of restoration increases.

The restoration processing unit 20 performs the image restoration processing that reduces a blur to the noise-processed image, to generate an output image. Specifically, the restoration processing unit 20 performs the image restoration processing using the restoration function indicating a degree of restoration at each frequency in the frequency domain.

It is to be noted that any algorithms may be used for the image restoration processing, as long as the algorithm reduces the blur. As the simplest example, the image restoration processing is processing of multiplying the restoration function shown in Equation 1 to the noise-processed image, in the frequency domain. Furthermore, the image restoration processing may be, for example, processing using the Lucy-Richardson (LR) method or the Wiener Filter method which are publicly known.

Next, details of the function structure of the noise processing unit 10 are described.

Figure 2:
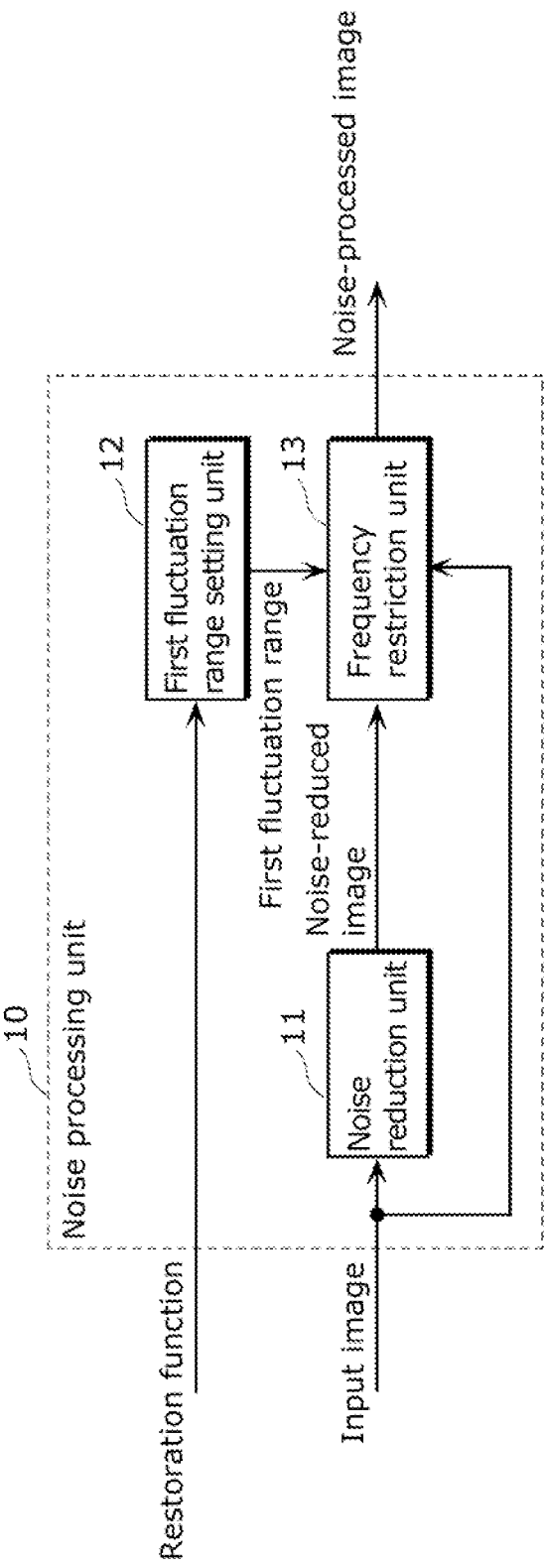
FIG. 2 is a block diagram showing a function structure of an noise processing unit according to Embodiment 1 of the present invention.

FIG. 2 is a block diagram showing the function structure of the noise processing unit 10 according to Embodiment 1 of the present invention.

As shown in FIG. 2, the noise processing unit 10 includes a noise reduction unit 11, a first fluctuation range setting unit 12, and a frequency restriction unit 13. In the present embodiment, the noise processing is executed by the noise reduction unit 11, the first fluctuation range setting unit 12, and the frequency restriction unit 13.

The noise reduction unit 11 performs noise reduction processing to the input image in a spatial domain, to generate a noise-reduced image.

The first fluctuation range setting unit 12 sets a first fluctuation range for restricting the degree of variation for each frequency, based on the characteristic of the image restoration processing. Specifically, the first fluctuation range setting unit 12 sets a first fluctuation range for each frequency such that a first fluctuation range at the frequency decreases as the degree of restoration at the frequency increases.

The frequency restriction unit 13 modifies, in the frequency domain, the noise-reduced image to generate a noise-processed image such that a variation indicating the magnitude of the degree of variation does not exceed the first fluctuation range.

Figure 3:
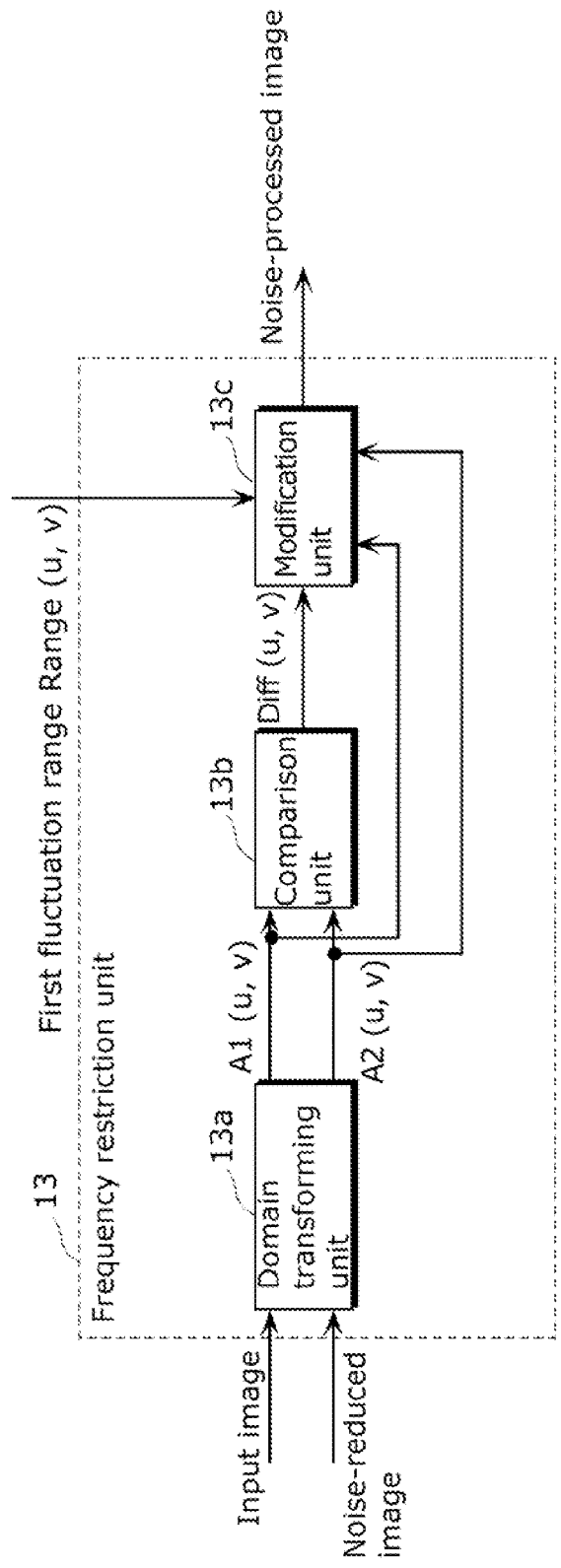
FIG. 3 is a block diagram showing a function structure of a frequency restriction unit according to Embodiment 1 of the present invention.

FIG. 3 is a block diagram showing the function structure of the frequency restriction unit 13 according to Embodiment 1 of the present invention. As shown in FIG. 3, the frequency restriction unit 13 includes a domain transforming unit 13a, a comparison unit 13b, and a modification unit 13c.

The domain transforming unit 13a transforms the input image and the noise-reduced image from the spatial domain into the frequency domain. Specifically, the domain transforming unit 13a transforms the input image and the noise-reduced image by the Fourier transform.

The comparison unit 13b calculates, for each frequency, an absolute value of a difference value between (i) an amplitude of the input image transformed into the frequency domain and (ii) an amplitude of the noise-reduced image transformed into the frequency domain, as the variation.

The modification unit 13c determines whether or not the calculated absolute value of the difference value exceeds the first fluctuation range, for each frequency. Here, when it is determined that the absolute value of the difference value exceeds the first fluctuation range, the modification unit 13c modifies the amplitude of the noise-reduced image such that the absolute value of the difference value at the frequency matches the first fluctuation range. In contrast, when it is determined that the absolute value of the difference value does not exceed the first fluctuation range, the modification unit 13c does not modify the amplitude of the noise-reduced image at the frequency.

As described above, the noise processing unit 10 performs the noise processing such that the degree of variation at the frequency becomes more restricted as the degree of restoration at the frequency increases.

Next, various operations of the image processing apparatus 100 structured as the above are described.

Figure 4:
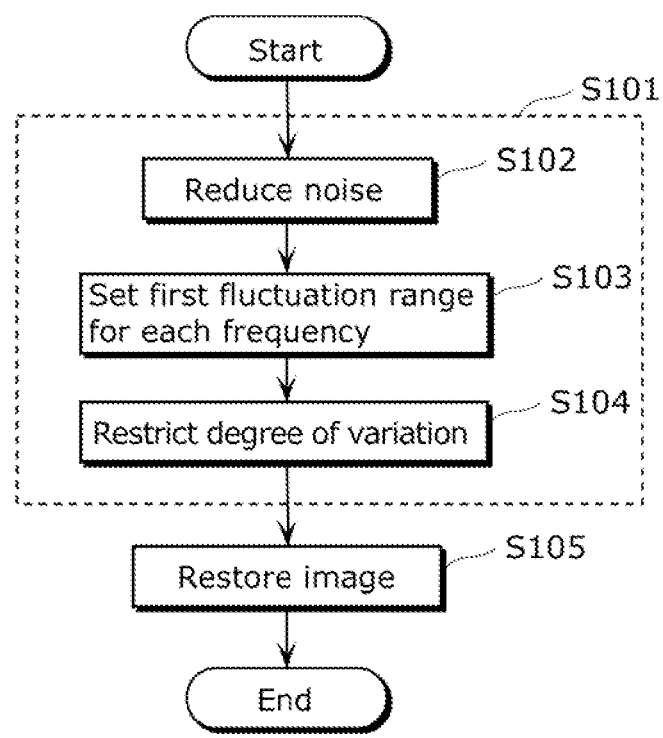
FIG. 4 is a flowchart showing a flow of processing of the image processing apparatus according to Embodiment 1 of the present invention.

FIG. 4 is a flowchart showing the flow of processing of the image processing apparatus 100 according to Embodiment 1 of the present invention.

First, the noise processing unit 10 performs the noise processing that reduces noise to the input image, to generate a noise-processed image (S101).

Specifically, processing of the steps S102 to S104 below is executed in the step S101. The noise reduction unit 11 performs noise reduction processing to the input image in the spatial domain (S102). In the present embodiment, the noise reduction processing is not required to be particularly limited and may be any processing as long as noise reduction effect is obtained. For example, the noise reduction processing may be a low-pass filter noise reduction processing, a bilateral filter noise reduction processing, and a wavelet noise reduction processing, or the like, which are common.

Next, the first fluctuation range setting unit 12 sets the first fluctuation range for each frequency (S103), based on the characteristic of the image restoration processing. Here, the characteristic of the image restoration processing indicates the degree of restoration indicated by the restoration function that is used when the restoration processing unit 20 performs the image restoration processing.

The restoration function is derived from the Point Spread Function (PSF) that represents a blur or a motion blur in the image when capturing. The most primitive restoration function is represented by an inverse function of the PSF and has a characteristic as shown in (a) in FIG. 5. It is to be noted that the restoration function is not necessarily be the inverse function of the PSF and may be a transform function that approximates to the inverse function of the PSF.

Figure 5:
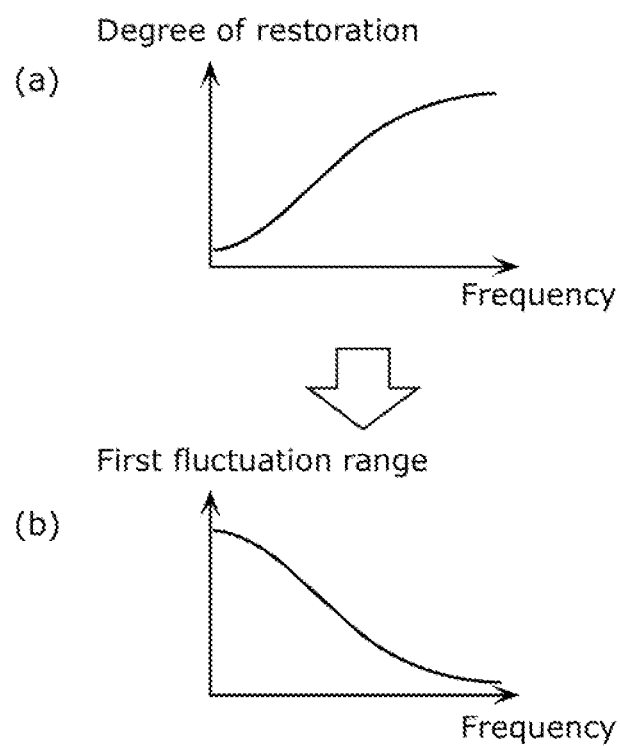
FIG. 5 illustrates processing of a first fluctuation range setting unit according to Embodiment 1 of the present invention.

FIG. 5 illustrates processing of the first fluctuation range setting unit 12 according to Embodiment 1 of the present invention. Specifically, (a) in FIG. 5 shows an example of the restoration function, and (b) in FIG. 5 shows an example of the first fluctuation range.

When a blur is caused in an input image, high-frequency component of the input image is attenuated, which causes details or edges of the input image to be not clear. Therefore, the high-frequency component is required to be emphasized in order to restore the input image. The restoration function is generally set as shown in (a) in FIG. 5. That is, the restoration function is set such that the degree of restoration increases as the frequency increases. Here, if the image is degraded when the noise reduction unit 11 has performed the noise reduction processing, this degradation of the image is also emphasized by the image restoration processing.

In order to prevent the degradation of the image caused by the noise reduction processing from being emphasized by the image restoration processing, the first fluctuation range setting unit 12 sets the first fluctuation range for each frequency such that the first fluctuation range at the frequency decreases as the degree of restoration at the frequency increases.

For example, when the first fluctuation range at each frequency is represented as Range (u, v), Range (u, v) is set such that a value decreases as the frequency increases, as shown in (b) in FIG. 5. Specifically, Range (u, v) is calculated by, for example, subtracting a value indicating the degree of restoration from a predetermined constant value. Furthermore, for example, Range (u, v) may be calculated by dividing the predetermined constant value by the value indicating the degree of restoration. That is, Range (u, v) may be calculated by any methods as long as the value decreases as the degree of restoration increases.

Next, the frequency restriction unit 13 modifies the noise-reduced image of which the noise is reduced by the noise reduction unit 11 (S104), in accordance with the first fluctuation range set by the first fluctuation range setting unit 12. Details of the processing of the step S104 are described later with reference to FIG. 6.

Finally, the restoration processing unit 20 performs the image restoration processing that reduces a blur to the noise-processed image (S105), and ends the processing.

The processing of the frequency restriction unit 13 (S104) is described below with reference to FIG. 6.

Figure 6:
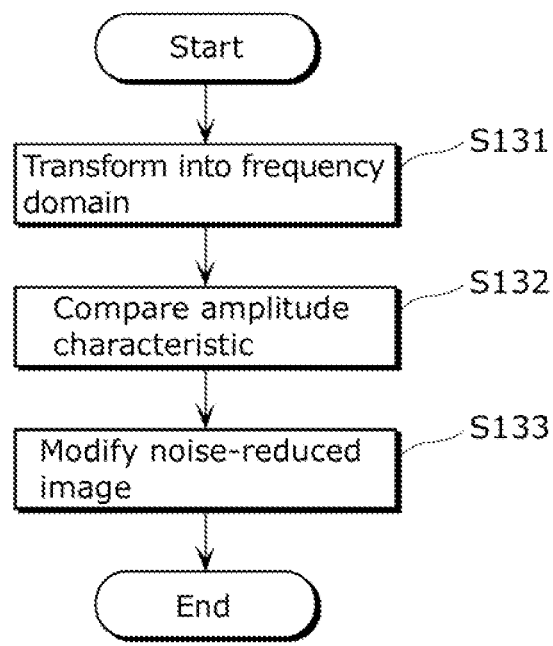
FIG. 6 is a flowchart showing a flow of processing of the frequency restriction unit according to Embodiment 1 of the present invention.

FIG. 6 is a flowchart showing a flow of processing of the frequency restriction unit 13 according to Embodiment 1 of the present invention.

First, the domain transforming unit 13a transforms the input image and the noise-reduced image into the frequency domain by the Fourier transform, and calculates (i) an amplitude characteristic of the input image, A1 (u, v), and (ii) an amplitude characteristic of the noise-reduced image, A2 (u, v) (S131). The comparison unit 13b then compares the amplitude characteristic A1 (u, v) and A2 (u, v) for each frequency, and calculates difference between the amplitudes, Diff (u, v), as shown in Equation 3 (S132).
[Math. 3]

$$Diff(u,v)=A2(u,v)-A1(u,v) \quad \text{Equation 3}$$

Diff (u, v) represents the degree of variation of the amplitude in the frequency domain of (i) the noise-reduced image that is the image after the noise reduction processing and (ii) the input image that is the image before the noise reduction processing. An absolute value of Diff (u, v) indicates the degree of variation of the image by the noise reduction processing. A great absolute value of Diff (u, v) means that the image has significantly varied by the noise reduction processing. That is, the absolute value of Diff (u, v) corresponds to the variation indicating the degree of variation of the noise-reduced image from the input image in the frequency domain.

Next, the modification unit 13c restricts the degree of variation in the frequency domain (S133), using a magnitude relation between (i) the absolute value of Diff (u, v) and (ii) Range (u, v), Diff (u, v) being the calculated difference between the amplitudes, and Range (u, v) being the first fluctuation range set by the first fluctuation range setting unit 12. Specifically, the modification unit 13c compares (i) the absolute value of Diff (u, v) and (ii) Range (u, v), Diff (u, v) being the difference between the amplitudes, and Range (u, v) being the fluctuation range. When the absolute value of Diff (u, v) is greater than Range (u, v), the modification unit 13c modifies A2 (u, v) such that the absolute value of the difference between the amplitudes matches the first fluctuation range at the frequency, Diff (u, v) being the difference between the amplitudes, Range (u, v) being the first fluctuation range, and A2 (u, v) being the amplitude characteristic of the noise-reduced image. That is, because the image may have been degraded by the noise reduction processing, the modification unit 13c modifies A2 (u, v), the amplitude characteristic of the image of which the noise is reduced by Equation 4 below.
[Math. 4]

$$A2(u,v)=A1(u,v)+\text{sign}(Diff(u,v))\times\text{Range}(u,v) \quad \text{Equation 4}$$

Here, sign(x) is a signum function which represents a sign of "X".

Figure 7:
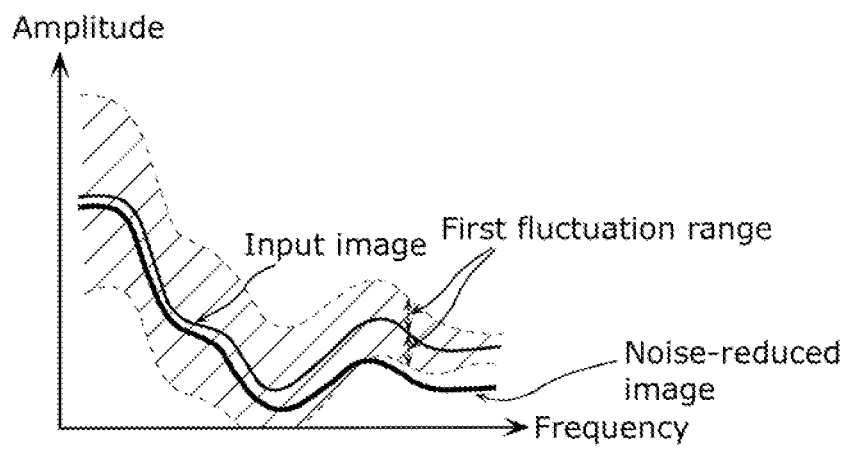
FIG. 7 illustrates a noise-processed image generated by the noise processing unit according to Embodiment 1 of the present invention.
Figure 7:
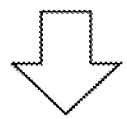
Figure 7:
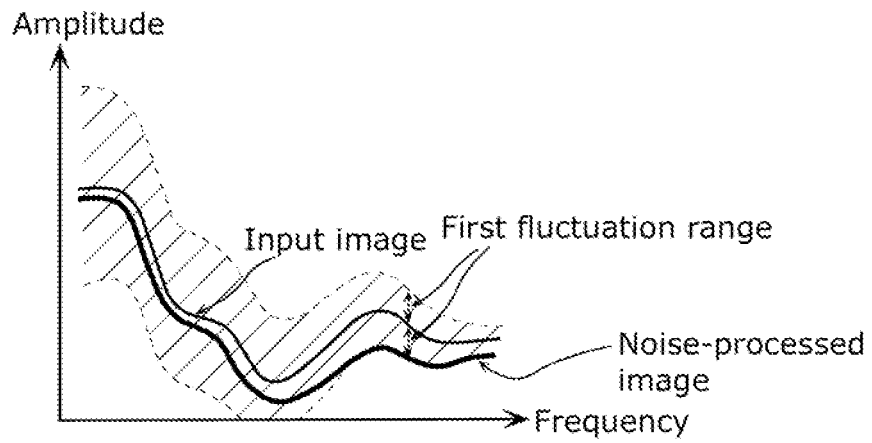

FIG. 7 illustrates the noise-processed image generated by the noise processing unit 10 according to Embodiment 1 of the present invention. Specifically, (a) in FIG. 7 shows an example of the amplitude characteristic of the noise-reduced image generated by the noise reduction unit 11. Furthermore, (b) in FIG. 7 shows an example of the amplitude characteristic of the noise-processed image generated by the frequency restriction unit 13. It is to be noted that FIG. 7 shows the amplitude characteristic in a cross section along a u-axis.

As shown in FIG. 7, the frequency restriction unit 13 modifies the amplitude, of which the absolute value of the difference value from the amplitude of the input image exceeds the first fluctuation range, into an amplitude that is different from the amplitude of the input image by the range of the first fluctuation range. As a result of the above modification, an image having a small variation of amplitude is generated at the frequency having a higher degree of restoration, as the noise-processed image.

As described above, the image processing apparatus 100 according to the present invention performs the noise processing prior to the image restoration processing, thereby reducing the noise included in the input image and restraining the noise from being emphasized by the image restoration processing. Moreover, the image processing apparatus 100 performs the noise processing based on the characteristic of the image restoration processing, thereby restraining the degradation of the image caused by the noise processing from being emphasized by the image restoration processing.

Furthermore, the image processing apparatus 100 can restrict the degree of variation at the frequency as the degree of restoration at the frequency increases. Accordingly, the image processing apparatus 100 can perform the noise processing such that the image at the frequency in which the degradation of the image is likely to be emphasized is prevented from being degraded, thereby efficiently restraining the degradation of the image caused by the noise processing from being emphasized by the image restoration processing.

Although the restoration function is derived from the PSF in the present embodiment, the restoration function is not necessarily be derived from the PSF. For example, the restoration function may de derived from a degradation function representing degradation caused by an optical system of a camera or a degradation function representing degradation caused by motion of a camera. That is, it is sufficient that the restoration function is derived from a degradation function representing degradation of an input image.

Although the first fluctuation range setting unit 12 sets the first fluctuation range as shown in (b) in FIG. 5 in the present embodiment, the first fluctuation range is not necessarily be set as shown in the drawing as long as a condition is satisfied, the condition being that the first fluctuation range decreases as the degree of restoration increases. The first fluctuation range setting unit 12 may further set the first fluctuation range such that the first fluctuation range is in a range of an upper limit and a lower limit that are predetermined.

Although the domain transforming unit 13a uses the Fourier transform when transforming the image into the frequency domain in the present embodiment, other transform methods may be used as long as the image can be transformed into the frequency domain.

[Embodiment 2]

Next, Embodiment 2 of the present invention is described.

Although the image processing apparatus according to the present embodiment is different from the image processing apparatus according to Embodiment 1 in a portion of the noise processing unit 10, other portions are the same. Accordingly, Embodiment 2 is described focusing on the part that is different from Embodiment 1, with reference to the drawings.

Figure 8:
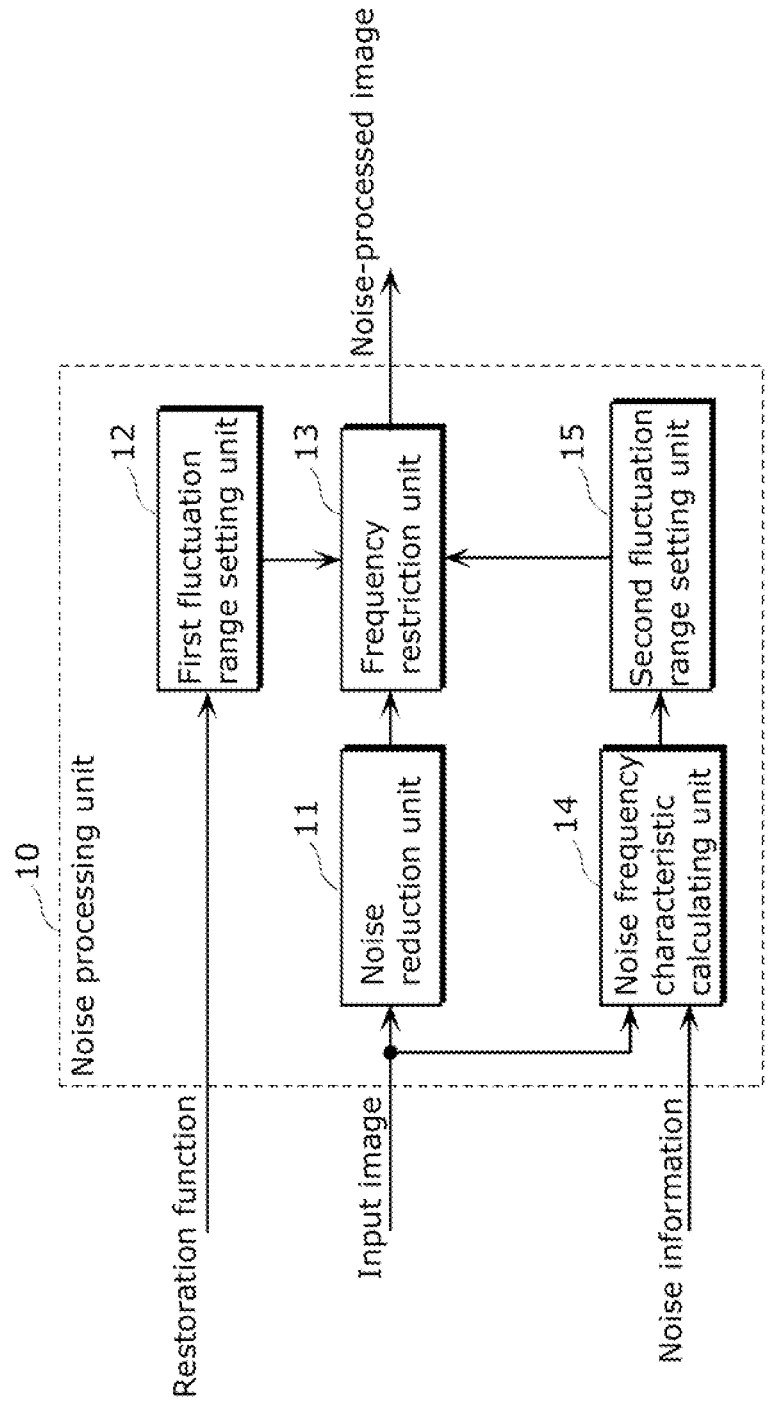
FIG. 8 is a block diagram showing a function structure of an noise processing unit according to Embodiment 2 of the present invention.

FIG. 8 is a block diagram showing the function structure of the noise processing unit 10 according to Embodiment 2 of the present invention. In FIG. 8, constituents common to FIG. 2 are denoted by the same numerals and description is omitted as appropriate.

A noise frequency characteristic calculating unit 14 calculates a frequency characteristic of noise using an input image and noise information.

A second fluctuation range setting unit 15 sets a second fluctuation range that is uniform regardless of the frequency, based on the frequency characteristic of the noise calculated by the noise frequency characteristic calculating unit 14.

First, details of processing by the noise frequency characteristic calculating unit 14 are described.

Random noise that is generally included in an image has a characteristic that the amplitude is approximately the same in all frequencies when the luminance of the image is constant. Furthermore, by an enhancement of the ISO sensitivity when capturing, a captured image is gain-upped and the noise is amplified. Here, if an amount of noise of each of plural images, each having a combination of an average luminance and the ISO sensitivity that is different from each other, is calculated in advance, a table in which (i) the average luminance and the ISO sensitivity and (ii) the frequency characteristic (for example, the maximum value of the amplitude) are associated can be generated.

In this case, the noise frequency characteristic calculating unit 14 can refer to the table, to calculate the frequency characteristic of the noise associated with a sensor characteristic of the camera, an average luminance in an input image area, and ISO sensitivity information when capturing. That is, the noise frequency characteristic calculating unit 14 can calculate the maximum value of the amplitude of the noise in the frequency domain, that is associated with the sensor characteristic of the camera, the average luminance in the input image area, and the ISO sensitivity information when capturing.

First, the noise frequency characteristic calculating unit 14 calculates the average luminance of the input image. The noise frequency characteristic calculating unit 14 then refers to the table that is stored in advance, to calculate N_max associated with the calculated average luminance and the ISO sensitivity information obtained, N_max being the maximum value of the amplitude of the noise in the frequency domain.

Next, details of processing of the second fluctuation range setting unit 15 are described.

Here, when the input image, the true image signal, and the noise are represented as F (u, v), S (u, v), and N (u, v) respectively, the input image is represented as shown in Equation 5 below.

[Math. 5]

$$F(u,v)=S(u,v)+N(u,v) \quad \text{Equation 5}$$

Figure 9:
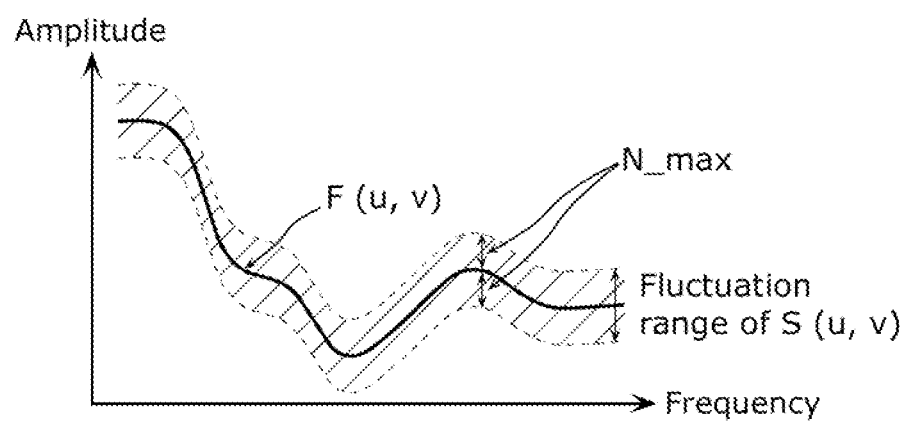
FIG. 9 illustrates an example of fluctuation of an image signal in a frequency domain according to Embodiment 2 of the present invention.
Figure 10:
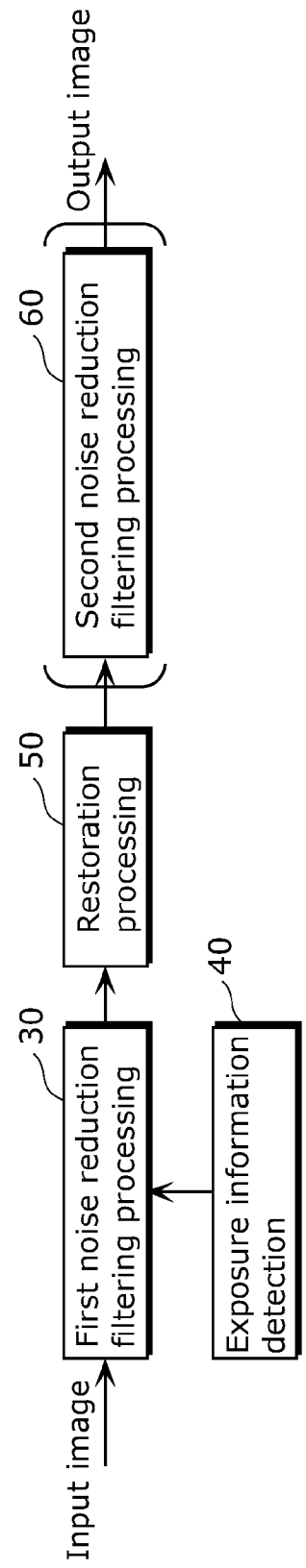
FIG. 10 shows a conventional image restoration processing.

Furthermore, the calculated maximum value of the amplitude of the noise is N_max. Accordingly, as shown in FIG. 9, it is identified that the true image signal S (u, v) fluctuates in a range of (F (u, v)±N_max) (hatched region) in each frequency component. That is, when the noise-reduced image exceeds this range (hatched region), it is identified that the true image signal is degraded by the noise reduction processing.

In order to restrain the degradation of the input image, the second fluctuation range setting unit 15 sets N_max as the second fluctuation range that is uniform regardless of the frequency, N_max being the maximum value of the amplitude of the noise.

Next, the frequency restriction unit 13 modifies the noise-reduced image such that the variation indicating the degree of variation of the noise-processed image from the input image in the frequency domain does not exceed the first fluctuation range and the second fluctuation range.

Specifically, the frequency restriction unit 13, for example, corrects Range (u, v) using N_max, Range (u, v) being the first fluctuation range set by the first fluctuation range setting unit 12 and N_max being the second fluctuation range set by the second fluctuation range setting unit 15.

Because the value of Range (u, v), the first fluctuation range, is a value calculated without using the noise characteristic, the value may be tolerant to a greater degree of variation than actual noise. Therefore, the frequency restriction unit 13 corrects Range (u, v) such that the maximum value of Range (u, v) is N_max. Specifically, the frequency restriction unit 13, for example, performs scale processing such that the maximum value of Range (u, v) is N_max. Furthermore, for example, the frequency restriction unit 13 may correct Range (u, v) such that a part that exceeds N_max in Range (u, v) matches N_max. The frequency restriction unit 13 then performs the same processing as in Embodiment 1 using corrected Range (u, v).

As described above, the image processing apparatus 100 according to the present embodiment can accurately estimate the maximum value of the amplitude of the noise, by calculating the frequency characteristic of the noise using the noise information. The image processing apparatus 100 can restrain the degradation of the image by the noise processing, by restricting the degree of variation of the noise-processed image from the input image in the frequency domain using the maximum value of the amplitude of the noise.

Although the noise frequency characteristic calculating unit 14 calculates the average luminance of the input image in the present embodiment, the average luminance of the noise-reduced image may be calculated. This is because the average luminance is hardly varied by the noise reduction processing.

Although the noise frequency characteristic calculating unit 14 calculates the maximum value of the amplitude of the noise using the table in which the average luminance and the ISO sensitivity are associated with the maximum value of the amplitude of the noise in the present embodiment, the maximum value of the amplitude of the noise is not necessarily be calculated using the table. For example, the noise frequency characteristic calculating unit 14 may calculate the maximum value of the amplitude of the noise using a mathematical expression that the maximum value of the amplitude of the noise can be calculated from the average luminance and the ISO sensitivity.

Although the noise frequency characteristic calculating unit 14 calculates the frequency characteristic of the noise for an overall image in the present embodiment, the frequency characteristic of the noise may be calculated for each image area. In this case, the noise frequency characteristic calculating unit 14 can obtain the average luminance in the image area more accurately, whereby the frequency characteristic of the noise can also be calculated more accurately.

Although the frequency restriction unit 13 corrects the first fluctuation range using the second fluctuation range in the present embodiment, the first fluctuation range is not necessarily be corrected. In this case, the frequency restriction unit 13 may, for example, restrict the degree of variation by using the first fluctuation range and the second fluctuation range in order. Specifically, the frequency restriction unit 13 may, for example, modify the noise-reduced image using the first fluctuation range and then modify the modified image using the second fluctuation range.

The image processing apparatus 100 according to an aspect of the present invention has been described above based on the embodiments, however, the present invention is not determined by these embodiments. The scope of the present invention includes other embodiments that are obtained by making various modification that those skilled in the art could think of, to the present embodiments, or by combining constituents in different embodiments.

For example, although the first fluctuation range setting unit 12 has set the first fluctuation range for each frequency in Embodiment 1 and Embodiment 2 above, the first fluctuation range setting unit 12 does not necessarily set the first fluctuation range for each frequency. For example, the first fluctuation range setting unit 12 may set the first fluctuation range for each predetermined frequency band.

Furthermore, part or all of the constituents included in the image processing apparatus 100 according to Embodiment 1 or Embodiment 2 above may be provided in one system LSI (large scale integration). For example, as shown in FIG. 1, the image processing apparatus 100 may be structured with a system LSI 101 that includes a noise processing unit 10 and a restoration processing unit 20.

The system LSI 101 is a super multifunctional LSI manufactured by integrating multiple components into one chip, and specifically, the system LSI 101 is a computer system that includes a microprocessor, a read only memory (ROM), a random access memory (RAM) and so forth. The RAM has a computer program stored. The System-LSI performs its functions through the microprocessor's operation according to the computer program.

The name used here is LSI, however, it may also be called IC, LSI, super LSI, or ultra LSI depending on the difference in the degree of integration. Moreover, ways to achieve integration are not limited to the LSI, and the integration may be achieved by a dedicated circuit or a general purpose processor and so forth. Field Programmable Gate Array (FPGA) that can be programmed after manufacturing LSIs or a reconfigurable processor that allows re-configuration of the connection or setting of an LSI can also be used.

In the future, with advancement in semiconductor technology or a different technology derived from the semiconductor technology, a brand-new technology may replace LSI. The functional blocks can be integrated using such a technology. The possibility is that the present invention is applied to biotechnology.

Furthermore, the present invention may be achieved not only as an image processing apparatus that includes characteristic processing units as described above but also as an image processing method that includes the characteristic processing units of the image processing apparatus as steps. Moreover, the present invention may be achieved as a computer program causing a computer to execute each of the characteristic steps included in the image processing apparatus. As a matter of course, such a computer program may be distributed via a non-transitory computer-readable storage medium such as a compact disc read only memory (CD-ROM), and a communications network such as the Internet.

Furthermore, the present invention may be achieved as an imaging apparatus having the image processing apparatus and an imaging device.

[Industrial Applicability]

The image processing apparatus according to the present invention is useful as an image processing apparatus and an image processing method that can reduce noise and restrain degradation of an image concurrently, by adjusting noise reduction processing based on a characteristic of image restoration processing when reducing a blur in the image.

[Reference Signs List]

10 Noise processing unit
11 Noise reduction unit
12 First fluctuation range setting unit
13 Frequency restriction unit
13a Domain transforming unit
13b Comparison unit
13c Modification unit
14 Noise frequency characteristic calculating unit
15 Second fluctuation range setting unit
20 Restoration processing unit
100 Image processing apparatus
101 System LSI

The invention claimed is:

1. An image processing apparatus for reducing a blur in an input image, said image processing apparatus comprising:
a noise processing unit including:
a noise reduction unit configured to perform noise reduction processing to the input image in a spatial domain, to generate a noise-reduced image;
a first fluctuation range setting unit configured to set a first fluctuation range, such that the first fluctuation range decreases with respect to an increase in frequency; and
a frequency restriction unit configured to perform noise processing to modify the noise-reduced image to generate a noise-processed image such that a variation indicating a magnitude of a degree of variation does not exceed the first fluctuation range; and
a restoration processing unit configured to perform image restoration processing that reduces a blur to the noise-processed image, the image restoration processing being performed according to a degree of restoration,
wherein said noise processing unit is configured to perform the noise processing such that the degree of variation, according to which the noise processing is performed by said noise processing unit, becomes more restricted as the degree of restoration, according to which the image restoration processing is performed by said restoration processing unit, increases.

2. The image processing apparatus according to claim 1, wherein said noise processing unit is configured to perform the noise processing such that the degree of variation of the noise-processed image from the input image in a frequency domain becomes more restricted as the degree of restoration increases.

3. The image processing apparatus according to claim 2, wherein said restoration processing unit is configured to perform the image restoration processing using a restoration function indicating the degree of restoration at each frequency in the frequency domain, and
the degree of restoration is indicated by the restoration function.

4. The image processing apparatus according to claim 3, wherein said noise processing unit is configured to perform the noise processing such that the degree of variation at a frequency becomes more restricted as the degree of restoration at the frequency increases.

5. The image processing apparatus according to claim 4, wherein said frequency restriction unit includes:
a domain transforming unit configured to transform the input image and the noise-reduced image from the spatial domain into the frequency domain;
a comparison unit configured to calculate, for each frequency, an absolute value of a difference value between (i) an amplitude of the input image transformed into the frequency domain and (ii) an amplitude of the noise-reduced image transformed into the frequency domain, as the variation; and
a modification unit configured to (i) determine, for each frequency, whether or not the variation exceeds the first fluctuation range and (ii) modify the amplitude of the noise-reduced image such that the variation at the frequency matches the first fluctuation range when it is determined that the variation exceeds the first fluctuation range.

6. The image processing apparatus according to claim 4, further comprising a second fluctuation range setting unit configured to set a second fluctuation range that is uniform regardless of the frequency, based on noise information of the input image,
wherein said frequency restriction unit is configured to modify the noise-reduced image to generate the noise-processed image such that the variation does not exceed the first fluctuation range and the second fluctuation range.

7. The image processing apparatus according to claim 6, wherein the noise information is calculated using a sensor characteristic of a camera, an ISO sensitivity obtained when the input image is captured, and luminance of the input image.

8. The image processing apparatus according to claim 1, wherein said noise processing unit is configured to perform the noise processing based on the degree of restoration and noise information of the input image.

9. The image processing apparatus according to claim 8, wherein the noise information is calculated using a sensor characteristic of a camera, an ISO sensitivity obtained when the input image is captured, and luminance of the input image.

10. The image processing apparatus according to claim 1, wherein the degree of restoration is derived using an image degradation function of the input image.

11. The image processing apparatus according to claim 1, wherein said image processing apparatus is structured as an integrated circuit.

12. An image processing method for reducing a blur in an input image, said image processing method comprising:
    performing noise reduction processing to the input image in a spatial domain, to generate a noise-processed image;
    setting a first fluctuation range, such that the first fluctuation range decreases with respect to an increase in frequency;
    performing noise processing by modifying the noise-reduced image to generate a noise-processed image such that a variation indicating a magnitude of a degree of variation does not exceed the first fluctuation range; and
    performing image restoration processing that reduces a blur to the noise-processed image, the image restoration processing being performed according to a degree of restoration,
    wherein, in said performing of the noise processing, the noise processing is performed such that the degree of variation, according to which the noise processing is performed in said performing of the noise processing, becomes more restricted as the degree of restoration, according to which the image restoration processing is performed by said performing of the image restoration processing, increases.

13. A non-transitory computer-readable recording medium for use in a computer, said recording medium having a computer program recorded thereon for causing the computer to execute said image processing method according to claim 12.

14. An image processing apparatus for reducing a blur in an input image, said image processing apparatus comprising:
    a noise processing unit including:
        a noise reduction unit configured to perform noise reduction processing to the input image in a spatial domain, to generate a noise-reduced image;
        a second fluctuation range setting unit configured to set a second fluctuation range that is uniform regardless of a frequency, based on noise information of the input image; and
        a frequency restriction unit configured to perform noise processing to modify the noise-reduced image to generate a noise-processed image such that a variation indicating a magnitude of a degree of variation does not exceed the second fluctuation range; and
    a restoration processing unit configured to perform image restoration processing that reduces a blur to the noise-processed image, the image restoration processing being performed according to a degree of restoration,
    wherein said noise processing unit is configured to perform the noise processing such that the degree of variation, according to which the noise processing is performed by said noise processing unit, becomes more restricted as the degree of restoration, according to which the image restoration processing is performed by said restoration processing unit, increases.

* * * * *